Patented Sept. 27, 1927.

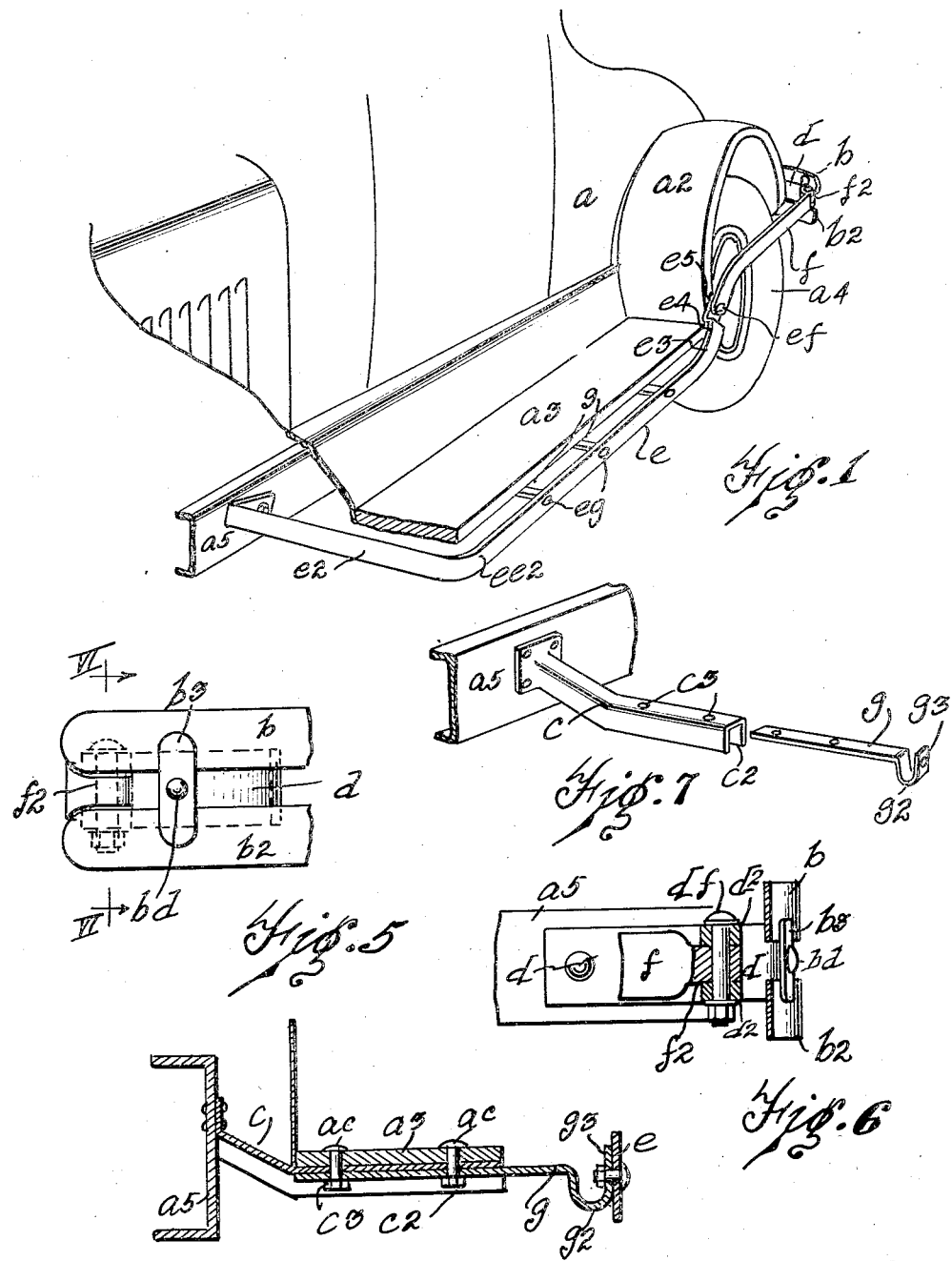

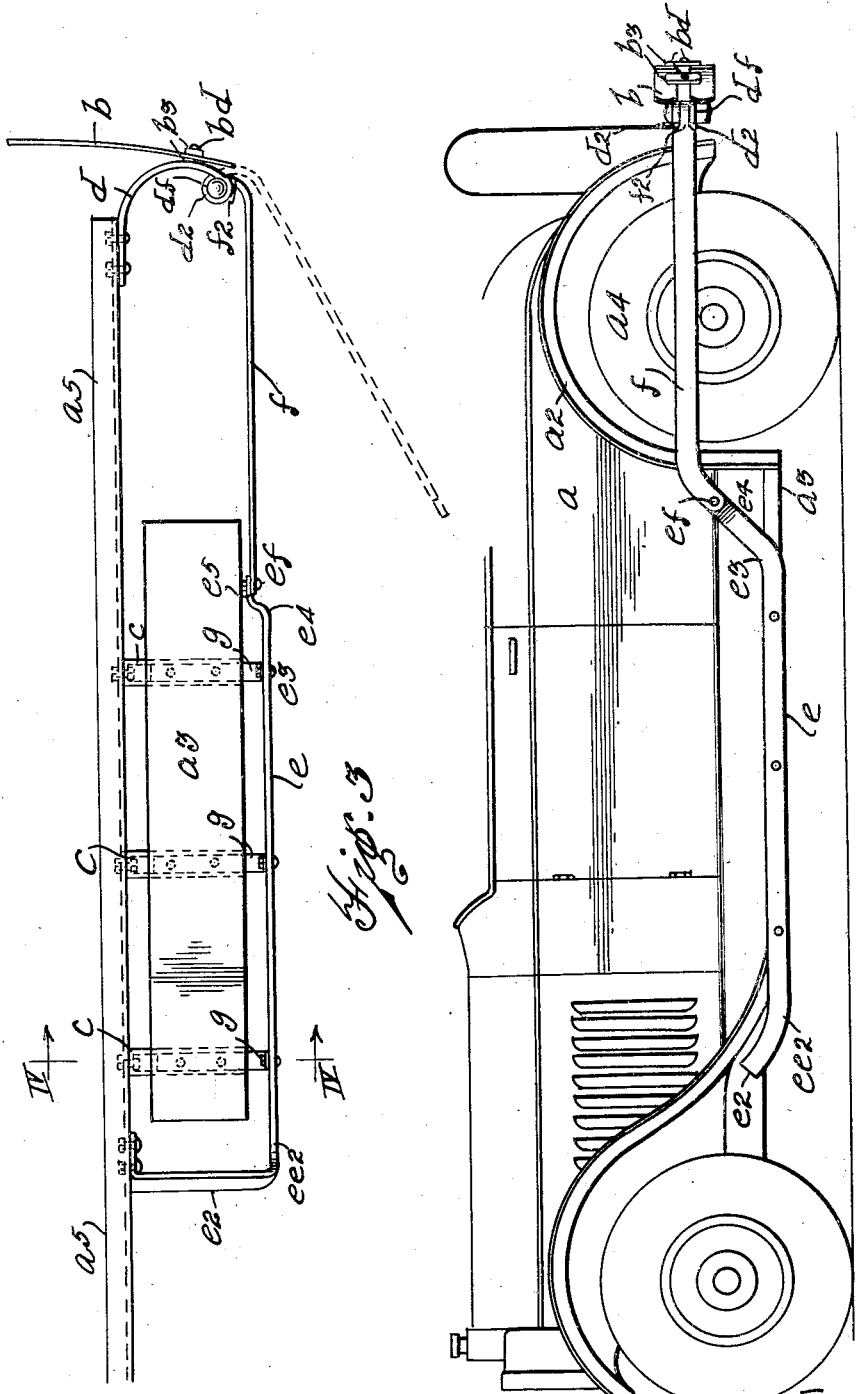

1,643,517

UNITED STATES PATENT OFFICE.

FRANK E. PRICE, OF PONTIAC, MICHIGAN.

SIDE BUMPER.

Application filed November 24, 1926. Serial No. 150,548.

My invention relates to bumpers for automobiles and objects of my improvement are to provide a bumper that shall protect the automobile at the side, that is easily adjustable and well adapted to its purpose and that shall protect the rear wheel while permitting the removal of said wheel.

I accomplish this object in the construction illustrated in the accompanying drawings, in which:—

Figure 1 is a perspective view of an apparatus embodying my invention and so much of an automobile as is necessary to show its connection therewith.

Figure 2 is a side elevation of an automobile with an apparatus embodying my invention attached thereto.

Figure 3 is a plan view of the apparatus and adjacent portions of the automobile at one side of the same, the body being removed.

Figure 4 is a section on the line IV, IV, Figure 3.

Figure 5 is a detailed elevation, looking from the rear of the automobile and showing one end of the rear bumper and the attachment of the side bumper or guard thereto.

Figure 6 is a side elevation, partly in section, illustrating the attachment of the side bumper or guard at the rear of the automobile.

Figure 7 is a perspective view of one of the foot board supporting brackets and a steel strap supporting the side bumper or guard, separate from said bracket.

$a$ is the body of the automobile, $a^2$ is the real wheel guard, $a^3$ the foot board, $a^4$ the rear wheel and $a^5$ a side piece of the chassis.

The rear bumper is made up of the parallel strips $b$ and $b^2$ bound together by a clip-strip $b^3$ and bolt $bd$.

$d$ is a bracket secured at one end to the side piece $a^5$, curving backward and outward and secured by the bolt $bd$ and clip-pieces $b^3$ to the strips $b$, $b^2$. The bracket $d$ extends beyond this attachment and is turned at its outer end to form the coaxial eyes $d^2$, $d^2$.

$e$ is a steel strip extending parallel to the outer edge of the foot board $a^3$ and spaced therefrom. The strip $e$ is bent inward at its forward end and extends inward in a part $e^2$ and is then secured to the side piece $a^5$ of the chassis.

The strip $e$ curves upward at $ee^2$ just before it is bent inward, as above described. Said strip is also bent up at $e^3$ and then inward at $e^4$ and then again backward at its rear end $e^5$, where it is provided with a transverse bolt hole.

$f$ is a second strip of steel of the same cross-section as the strip $e$, having one end removably connected to the rear end of the strip $e$ by a bolt and nut $ef$. The strip $f$ is provided with an eye $f^2$ at its rear end which passes between the eyes $d^2$, $d^2$ of the bracket $d$ and is pivotally secured to said bracket by a bolt $df$ passing through said eyes.

$g$ indicates straps turned downward and upward at their outer end, (Fig. 7) and secured at the inner surfaces of the strip $e$ by rivets or bolts passing through the bolt holes in the strip $e$ and in the upturned portion $g^3$ of the straps $g$. The straps $g$ pass into the channel $c^2$ of the bracket $c$ and are secured in position by the same bolts that secure the foot board, which bolts pass through the bolt holes $c^3$ in the bracket $c$ and corresponding bolt holes in the straps $g$.

When it is desired to remove a rear wheel $a^4$ the bolt $ef$ is taken out and the strip $f$ is turned about the pivot pin $df$, as indicated in broken lines in Figure 3, and to a position that shall be out of the way of the wheel when it is being removed. When the wheel is replaced the strip $f$ is turned back and is again secured by the bolt $df$ to the rear end $e^5$ of the strip $e$ thus forming with the strip $e$ a continuous side guard or bumper.

This forms a yielding guard that is well adapted to protect the side of the automobile and that may be readily and securely adjusted to position.

What I claim is:

1. In combination with an automobile having a channel iron bracket for supporting the foot board, a side guard having a supporting strap fitting into the channel of said bracket and secured thereto.

2. In combination with an automobile, a steel strip parallel to the side thereof and spaced therefrom, said strip consisting of two parts *e* and *f*, one of said parts being pivoted at one end and removably attached at the other end.

3. In combination with an automobile having a channel iron bracket for supporting the foot board, a side guard having an elastic supporting strap fitting into the channel of said bracket and secured thereto.

In testimony whereof, I sign this specification.

FRANK E. PRICE.